(12) United States Patent  (10) Patent No.: US 7,451,590 B2
Blase  (45) Date of Patent: Nov. 18, 2008

(54) ENERGY GUIDING CHAIN WITH INTEGRALLY MOLDED RUNNER

(75) Inventor: Gunter Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 11/738,198

(22) Filed: Apr. 20, 2007

(65) Prior Publication Data

US 2008/0010965 A1    Jan. 17, 2008

(30) Foreign Application Priority Data

Apr. 20, 2006  (DE)  ........................ 20 2006 006 492

(51) Int. Cl.
*F16G 13/16*  (2006.01)
(52) U.S. Cl. ............................. 59/78.1; 59/900; 248/49; 248/51
(58) Field of Classification Search ................. 59/78.1, 59/900; 248/48, 51, 49
See application file for complete search history.

(56) References Cited

U.S. PATENT DOCUMENTS

| | | | |
|---|---|---|---|
| 4,833,876 A * | 5/1989 | Kitao et al. | ................... 59/78.1 |
| 5,014,506 A * | 5/1991 | Moritz | ........................ 59/78.1 |
| 5,020,313 A | 6/1991 | Moritz et al. | |
| 5,201,885 A | 4/1993 | Wehler et al. | |
| 5,980,409 A | 11/1999 | Blase | |
| 6,156,974 A | 12/2000 | Blase | |
| 6,173,560 B1 | 1/2001 | Weber | |
| 6,318,063 B1 * | 11/2001 | Komiya et al. | ................ 59/78.1 |
| 6,425,238 B1 * | 7/2002 | Blase | ......................... 59/78.1 |
| 6,615,573 B2 * | 9/2003 | Blase | ......................... 59/78.1 |
| 6,997,412 B2 * | 2/2006 | Komiya | ................... 242/615.2 |
| 7,310,936 B2 * | 12/2007 | Saiki et al. | ................... 59/78.1 |

2005/0037881 A1  2/2005  Wehler et al.

FOREIGN PATENT DOCUMENTS

| | | |
|---|---|---|
| DE | 19541928 | 6/1997 |
| DE | 19605775 | 9/1997 |
| DE | 19647322 | 5/1998 |
| DE | 19852131 | 5/2000 |

(Continued)

OTHER PUBLICATIONS

German Search Report received in co-pending priority Application No. 20 2006 006 492.3, 4 pgs.

(Continued)

*Primary Examiner*—David B Jones
(74) *Attorney, Agent, or Firm*—Grossman Tucker Perreault & Pfleger, PLLC

(57) ABSTRACT

On an energy guiding chain for guiding hoses, cables or the like between two connecting points moving relative to each other, with several chain links connected to each other in articulated fashion, each of which displays two side straps and cross-pieces connecting them, where the chain consists of a strand that can be connected to one of the connecting points, and a strand that can be connected to the other connecting point, these transitioning into each other via a deflection zone, and where at least some of the chain links display runners covering the upper side of the side straps, it is envisaged that the runners be mounted on the cross-pieces at a distance from the side straps in order to reduce the assembly effort.

30 Claims, 3 Drawing Sheets

FOREIGN PATENT DOCUMENTS

| | | |
|---|---|---|
| DE | 10053262 | 5/2002 |
| DE | 10162066 | 7/2003 |
| DE | 202005005763 | 9/2005 |
| DE | 202006019646 | 5/2007 |
| EP | 0415029 | 3/1991 |
| EP | 0456537 | 11/1991 |
| EP | 0499791 | 1/1992 |
| WO | WO2004092614 | 10/2004 |

OTHER PUBLICATIONS

International Search Report received in PCT Application No. PCT/DE2007/000678, 15 pgs.

* cited by examiner

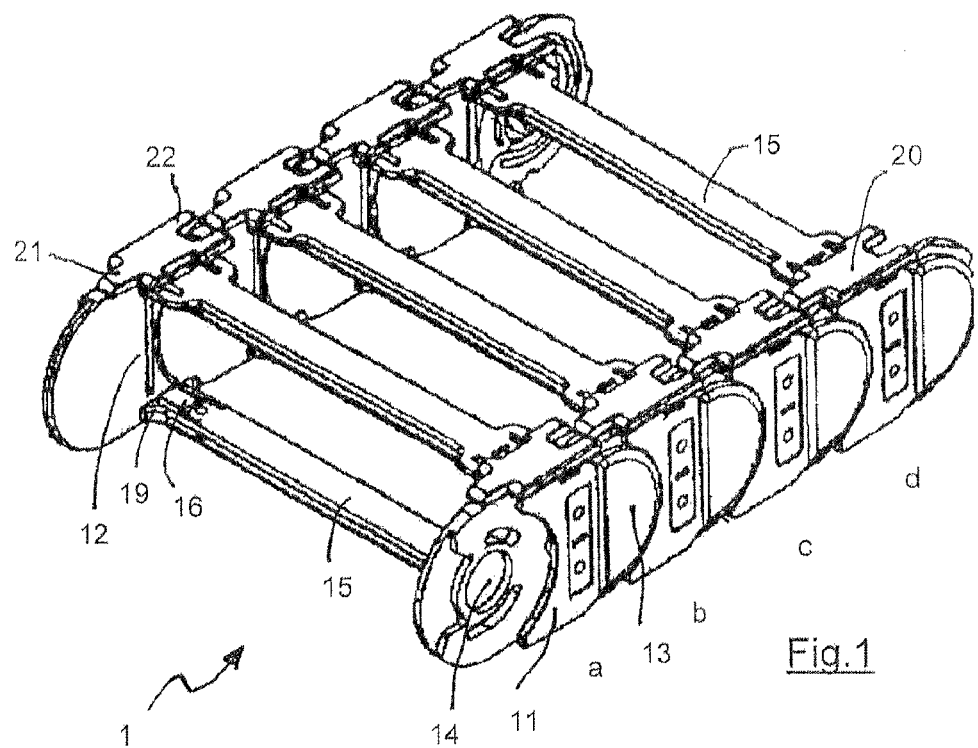
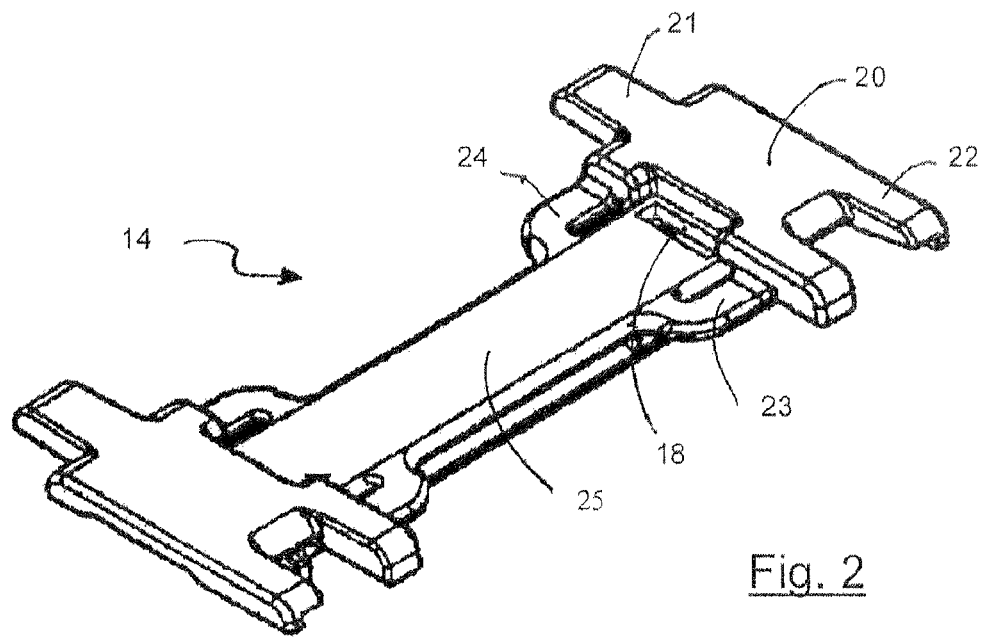

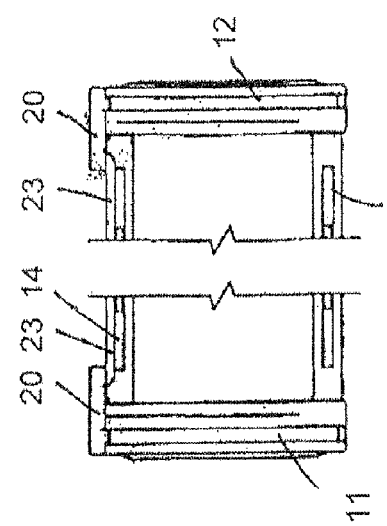
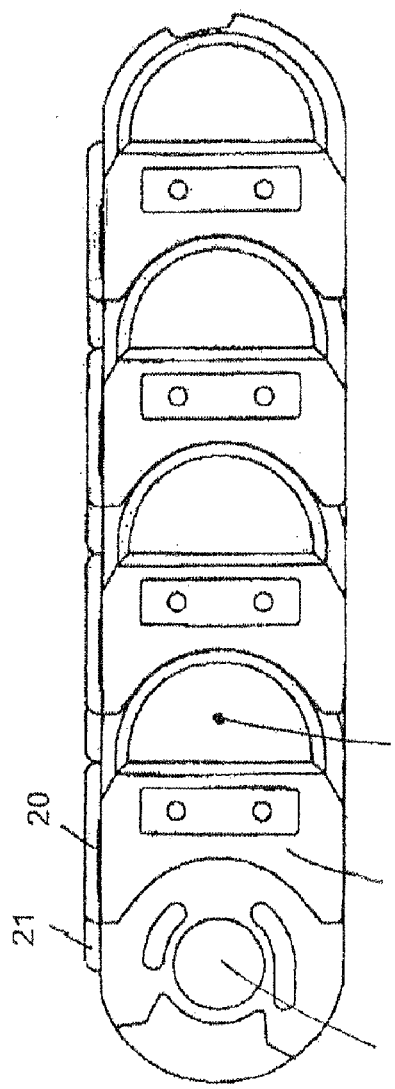
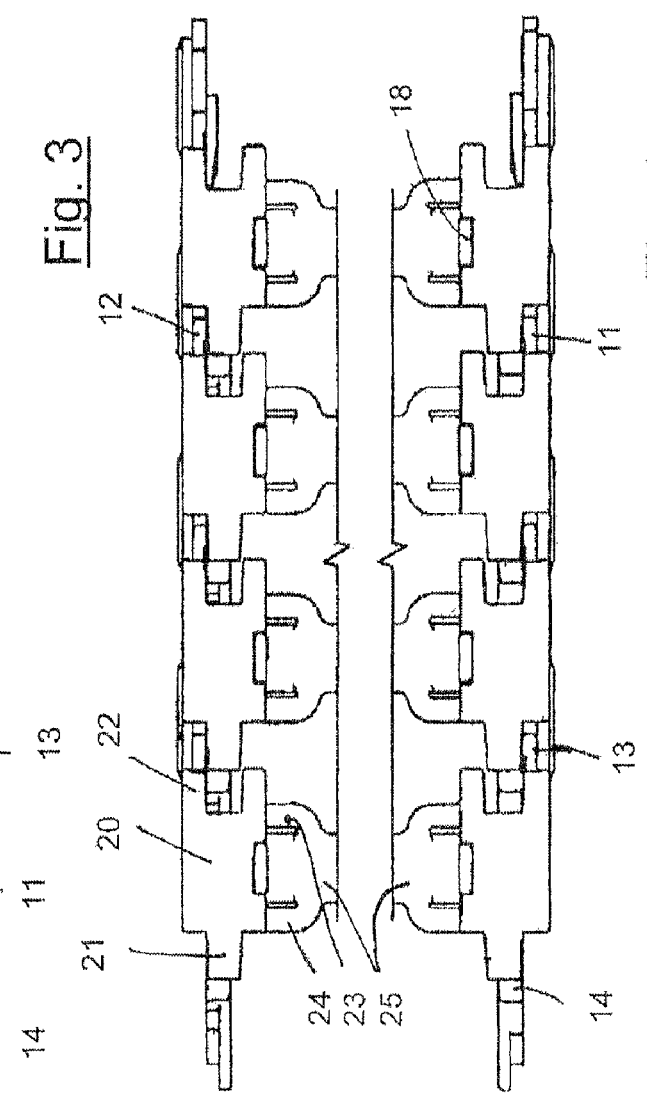
Fig. 3
Fig. 4
Fig. 5

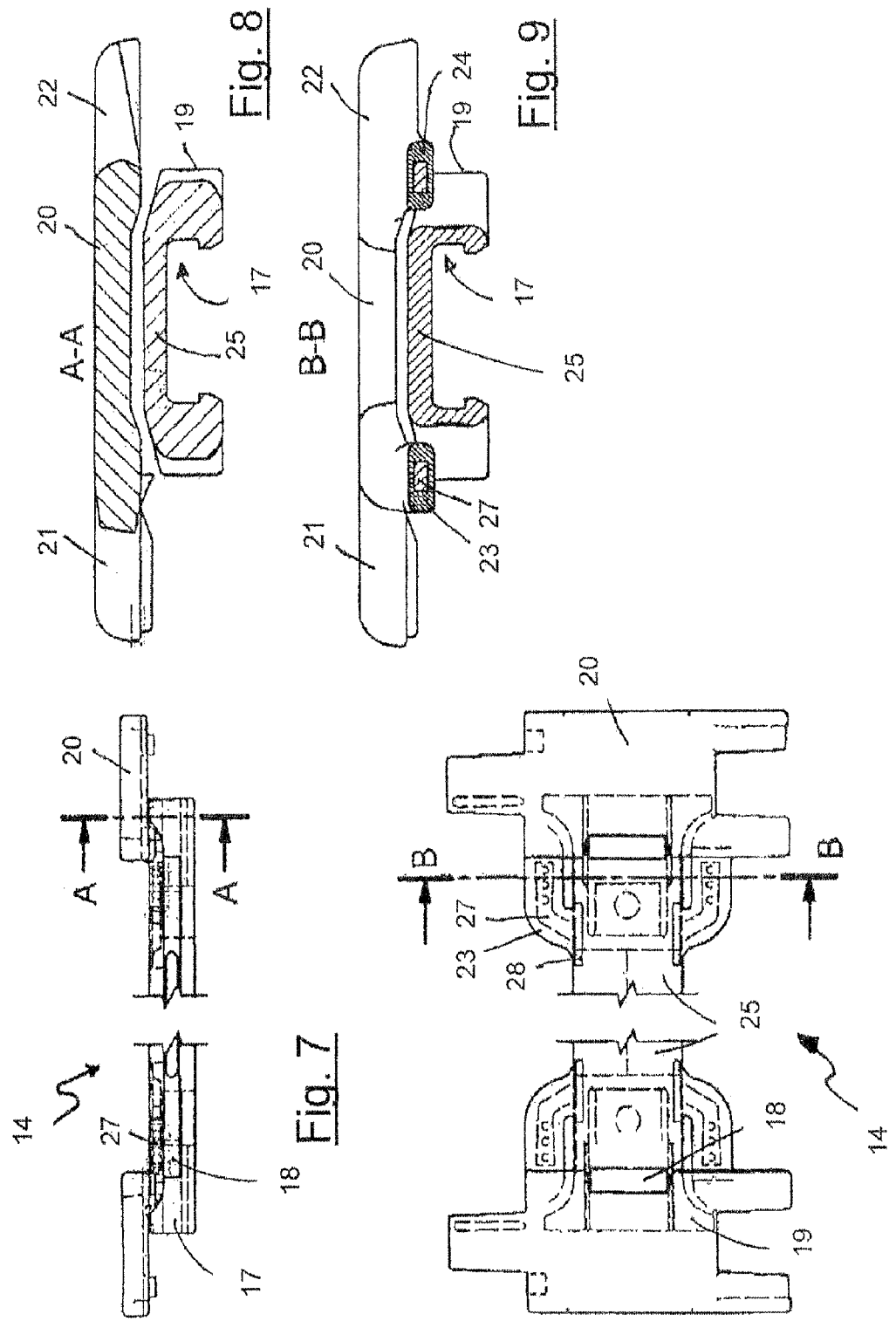

ENERGY GUIDING CHAIN WITH INTEGRALLY MOLDED RUNNER

The present invention relates to an energy guiding chain for guiding hoses, cables or the like between two connecting points moving relative to each other, as well as a cross-piece for energy chains of this kind.

Energy guiding chains of this kind consist of chain links connected in articulated fashion, each of which in turn displays two side straps that are connected by at least one cross-piece. The side straps display connecting elements on both sides in the chain direction, via which they can be connected to corresponding side straps of adjacent chain links in articulated fashion. The energy lines to be guided, such as hoses, cables, etc., are enclosed by the chain links. If two cross-pieces are provided for connecting the side straps, at least one of the cross-pieces of a chain link is connected to the side straps in detachable fashion via snap connections.

The energy guiding chain consists of a chain end section (strand) that can be connected to the one connecting point, and a chain end section (strand) that can be connected to the other connecting point, as well as a deflection zone (deflecting chain section). The two end sections connected via the deflection zone are guided in a guide trough on both sides of the deflection zone, such that the two chain sections (lower strand and upper strand) slide on each other when the connecting points move relative to each other. The sliding of the chains on each other, on the base, and laterally on the side walls of the guide trough, causes wear on the respective contact surfaces. Moreover, the movement of the chain links is associated with undesirable noise generation, particularly when a chain link exiting the deflection zone strikes the base or the lower strand.

It has thus already been proposed to provide runners, connected to the side straps in detachable fashion, which are made of more wear-resistant material than the chain links (EP 415029, EP 456537) and contribute to noise damping. Finally, a one-piece chain link, consisting of two side straps and a cross-piece, is known from DE 19647322, where runners are integrally molded beneath the chain link on the connecting edge between the side strap and the cross-piece, extending over the width of the transverse extension of the side straps.

The object of the invention is to provide energy guiding chains with improved sliding properties.

A further object of the invention is to provide energy guiding chains with reduced wear due to sliding friction.

A further object of the invention is to provide energy guiding chains with improved noise damping.

The object of the invention is furthermore to provide energy guiding chains requiring little assembly effort.

Finally, it is the object of the invention to provide energy guiding chains offering easy replacement of the parts subject to wear due to sliding friction.

These and other objects are solved by the energy guiding chain according to the invention and the cross-piece according to the invention.

The subject matter of the invention is an energy guiding chain for guiding hoses, cables or the like between two connecting points moving relative to each other, with several chain links connected to each other in articulated fashion, each of which displays two side straps and cross-pieces connecting them, where the chain consists of a strand that can be connected to one of the connecting points, and a strand that can be connected to the other connecting point, these transitioning into each other via a deflection zone, and where at least some of the chain links display runners covering the upper side of the side straps, characterized in that the runners are mounted on the cross-pieces at a distance from the side straps.

According to the invention, the runners preferably consist of a more flexible, abrasion-resistant plastic material with good sliding properties, especially of a more flexible thermoplastic elastomer, than the side straps, which consist of particularly rigid material, especially rigid elastomers. It is furthermore currently preferable for the cross-pieces to likewise consist of rigid material.

The runners can be fastened to the cross-pieces by snap-fitting means, particularly if the cross-piece is designed in one piece with the two side straps of the chain link.

The runners are preferably integrally molded on the cross-pieces, particularly if the cross-piece is connected to the side straps of the chain link in detachable fashion by snap-fitting means. Integral molding can be performed in the known manner in a two-stage injection molding process, if the runners differ from the cross-piece in terms of the plastic material.

The cross-pieces and the runners can also be made of the same, more flexible material than the side straps, provided that this does not impair the stability of the chain link.

The runners can project beyond the outer side of the side straps, such that they also acquire a runner function laterally on the guide trough. In this context, the runners can also be designed in such a way that they reach around the upper side of the side straps.

The runners preferably project beyond the transverse extension of the side straps in the direction of the opposite side strap, such that a larger sliding surface is available compared to the runners of the prior art, where the runners merely cover the width of the side straps.

The runners further preferably form a continuous, plane sliding surface when the chain is stretched, where the runners are preferably designed in the manner of a comb in the direction of adjacent runners, with corresponding comb structures such that adjacent runners engage each other by virtue of their comb-like design. In this context, provision can be made for the runner to display a tongue in one direction and a fork in the other direction, where the tongue of the adjacent runner engages the fork. The overlap of the tongue and the fork in the chain direction when the chain is stretched can be minimal.

According to the invention, the runners are further preferably connected to the associated cross-piece via at least one elastically flexible arm. The arm can consist of the same material as the runner, but display a smaller cross-section. Two elastically flexible arms are preferably provided, running parallel to the cross-piece on either side, preferably reaching around it laterally, and merging into it as a result of integral molding.

According to one embodiment of the invention, provision can be made for the runners to cover the side straps at a distance from their upper side, i.e. for a gap to be formed between the upper side of the side strap and the underside of the runner, such that the runners can elastically absorb shocks and material unevennesses.

Furthermore, vibration-damping materials can be provided in the gap between the runner and the upper edge of the side strap. These can be designed in the form of one or more mushroom heads or plates engaging corresponding recesses on the upper side of the side straps. One suitable damping material is polyurethane, for example. The damping material is preferably under elastic prestress between the runner and the upper side of the side strap.

According to a further embodiment of the invention, the runners integrally molded on the cross-piece are designed in such a way that, after connecting the cross-piece and the side strap, they rest on the upper side of the side strap under elastic prestress.

The subject matter of the invention is also a cross-piece, which can be connected via snap-fitting means to side straps of an energy guiding chain displaying joint elements, with integrally molded runners, where the runners project beyond the surface provided on the side strap to act as a stop for the cross-piece and are integrally molded at a distance from the stop face.

Further preferred and expedient characteristics of the cross-piece according to the invention are presented in the above description of the energy guiding chain according to the invention.

Further expedient and preferred characteristics of the invention are revealed in the attached drawings, on the basis of which the invention is explained below without restricting the general nature of the above description.

FIG. 1 shows a perspective view of a section of the energy guiding chain according to the invention, comprising 4 chain links.

FIG. 2 shows a perspective view of a cross-piece according to the invention.

FIG. 3 shows a side view of a section of an energy guiding chain according to the invention.

FIG. 4 shows a top view of the energy guiding chain according to FIG. 3.

FIG. 5 shows a transverse view of the energy guiding chain according to FIGS. 3 and 4.

FIG. 6 shows an enlarged top view of a cross-piece according to the invention.

FIG. 7 shows a side view of the cross-piece according to FIG. 6.

FIG. 8 shows the section along line A-A according to FIG. 7.

FIG. 9 shows the section along line B-B according to FIG. 6.

Identical reference numbers in the drawings denote identical elements.

The energy guiding chain section according to FIG. 1, shown in stretched form and generally referred to as 1, consists of 4 identically designed chain links a, b, c, d. Each of the chain links consists of two side straps 11 and 12, as well as cross-pieces or cross-members 14, 15. The side straps are connected to each other in articulated fashion via front and rear joint elements 13, 14. The cross-pieces are connected to the side straps via snap connections 16. The snap-fitting means consist of snap-in hooks integrally molded on the side straps, which, via a guide 17 (FIG. 8), engage a snap-in opening 18 (FIG. 2) of the cross-piece by means of a snap-in lug. The transverse stability of the chain link is ensured by stop feet 19 (FIG. 6) in the form of a broader base of cross-piece 25. Other snap connections between the side straps and the cross-pieces are familiar to the person skilled in the art. The upper cross-pieces in the illustration have integrally molded runners 20. It can be seen that, transverse to the chain direction, the runners are designed broader than the transverse dimension of the side straps. In the chain direction, they moreover display a tongue 21 on one side and a fork 22 on the other side, these overlapping minimally when the chain is stretched.

As can be seen better in FIG. 2, runners 20 are integrally molded on cross-piece 25 via arms 23, 24 and otherwise free of the cross-piece.

FIGS. 3, 4 and 5 are plan views of the illustration in FIG. 1.

A preferred design of the integral molding of runners 20 on cross-member 25 can be seen in the enlarged top view of cross-piece 14 in FIG. 6. In the first molding step, preferably injection molding, cross-member 25 with arm stumps 27 of small cross-section (see also FIG. 9) and a recess 28 are formed. In the second molding step, using a more flexible material, recess 28 is filled out, arm stumps 27 are molded around to form the complete arms 23 and, moreover, runners 20 are formed.

The invention claimed is:

1. Energy guiding chain for guiding hoses and cables between two connecting points moving relative to each other, with several chain links connected to each other in articulated fashion, each of which displays two side straps and cross-pieces connecting them, said side straps each having an upper side and an outer side, said cross-pieces having an upper edge, where the chain consists of a strand that can be connected to one of the connecting points, and a strand that can be connected to the other connecting point, these transitioning into each other via a deflection zone, and where at least some of the chain links display runners covering the upper side of the side straps, said runners having an underside, characterized in that the runners are mounted on the cross-pieces at a distance from the side straps characterized in that the runners are integrally molded on the cross-pieces and the runners are integrally molded around the upper edge of the cross-pieces.

2. Energy guiding chain according to claim 1, characterized in that the runners project beyond the outer side of the side straps.

3. Energy guiding chain according to claim 1, characterized in that the runners consist of a more abrasion-resistant material than the cross-pieces.

4. Energy guiding chain according to claim 1, characterized in that the runners project inwardly in a transverse direction beyond the side straps.

5. Energy guiding chain according to claim 1, characterized in that the runners are connected to the cross-pieces via at least one elastically flexible arm.

6. Energy guiding chain according to claim 1, characterized in that the runners form a continuous plane sliding surface when the chain is stretched.

7. Energy guiding chain according to claim 1, characterized in that the runners are designed to engage in the longitudinal direction of the chain, such that adjacent runners engage each other by way of a tongue and fork on either end of each runner, with a tongue of one runner engaging a fork of the adjacent runner.

8. Energy guiding chain according to claim 1, including a snap fitting means, characterized in that the cross-pieces are connected to the side straps via said snap-fitting means.

9. Energy guiding chain according to claim 8, characterized in that the runners rest on said upper sides of the side straps.

10. Energy guiding chain according to claim 1, characterized in that the runners cover the side straps at a distance from their upper sides, such that a gap is formed between the upper side of the side strap and the underside of the runner.

11. Energy guiding chain according to claim 10, characterized in that vibration-damping materials are provided between the runner and the upper side of the side strap.

12. Energy guiding chain according to claim 11, characterized in that the vibration-damping material is under elastic stress between the runner and the upper side of the side strap.

13. Cross-piece, including snap fitting means which can be connected via said snap-fitting means to side straps of an energy guiding chain including joint elements, characterized by integrally molded runners that project beyond an upper side of the side strap to act as a stop for the cross-piece, said stop including a stop face, said runners having ends.

14. Cross-piece according to claim 13, characterized in that the runners are integrally molded at a distance from the stop face.

15. Cross-piece according to claim 14, characterized in that the runners are integrally molded with elastically flexible arms.

16. Cross-piece according to claim 13, characterized in that the runner consists of a more abrasion-resistant material than the cross-piece.

17. Cross-piece according to claim 13, characterized in that the runner consists of a more flexible material than the cross-piece.

18. Cross-piece according to claim 13, characterized in that the ends of the runners are designed to engage in the longitudinal direction of the chain, such that adjacent runners engage each other way of a tongue and fork on either end of each runner, with a tongue of one runner engaging a fork of the adjacent runner.

19. Energy guiding chain for guiding hoses and cables between two connecting points moving relative to each other, with several chain links connected to each other in articulated fashion, each of which displays two side straps and cross-pieces connecting them, said side straps having an upper side, where the chain consists of a strand that can be connected to one of the connecting points, and a strand that can be connected to the other connecting point, these transitioning into each other via a deflection zone, and where at least some of the chain links display runners covering the upper side of the side straps, characterized in that the runners are mounted on the cross-pieces at a distance from the side straps, characterized in that the runners are integrally molded on the cross-pieces and characterized in that the runners form a continuous plane sliding surface when the chain is stretched.

20. Energy guiding chain according to claim 19, characterized in that the runners are designed to engage in the longitudinal direction of the chain, such that adjacent runners engage each other by way of a tongue and fork on either end of each runner, with a tongue of one runner engaging a fork of the adjacent runner.

21. Energy guiding chain for guiding hoses and cables between two connecting points moving relative to each other, with several chain links connected to each other in articulated fashion, each of which displays two side straps and cross-pieces connecting them, said side straps having an upper side, where the chain consists of a strand that can be connected to one of the connecting points, and a strand that can be connected to the other connecting point, these transitioning into each other via a deflection zone, and where at least some of the chain links display runners covering the upper side of the side straps, characterized in that the runners are mounted on the cross-pieces at a distance from the side straps, characterized in that the runners cover the side straps at a distance from their upper sides, such that a gap is formed between the upper side of the side strap and the underside of the runner and characterized in that vibration-damping materials are provided between the runner and the upper side of the side strap.

22. Energy guiding chain according to claim 21, characterized in that the vibration-damping material is under elastic stress between the runner and the upper side of the side strap.

23. Energy guiding chain according to claim 21, characterized in that the runners consist of a more abrasion-resistant material than the cross-pieces.

24. Energy guiding chain according to claim 21, characterized in that the runners are connected to the cross-pieces via at least one elastically flexible arm.

25. Energy guiding chain according to claim 21, characterized in that the cross-pieces are connected to the side straps via snap-fitting means.

26. Energy guiding chain according to claim 25, characterized in that the runners rest on the upper sides of the side straps.

27. Cross-piece, which can be connected via snap-fitting means to side straps of an energy guiding chain including joint elements, characterized by integrally molded runners that project beyond an upper side of the side strap to act as a stop for the cross-piece, said stop including a stop face, said runners having ends, characterized in that the runners are integrally molded at a distance from the stop face, characterized in that the runners are integrally molded with elastically flexible arms.

28. Cross-piece, which can be connected via snap-fitting means to side straps of an energy guiding chain including joint elements, characterized by integrally molded runners that project beyond an upper side of the side strap to act as a stop for the cross-piece, said stop including a stop face, said runners having ends, characterized in that the runner consists of a more abrasion-resistant material than the cross-piece.

29. Cross-piece, which can be connected via snap-fitting means to side straps of an energy guiding chain including joint elements, characterized by integrally molded runners that project beyond an upper side of the side strap to act as a stop for the cross-piece, said stop including a stop face, said runners having ends, characterized in that the runner consists of a more flexible material than the cross-piece.

30. Cross-piece, which can be connected via snap-fitting means to side straps of an energy guiding chain including joint elements, characterized by integrally molded runners that project beyond an upper side of the side strap to act as a stop for the cross-piece, said stop including a stop face, said runners having ends, characterized in that the ends of the runners are designed to engage in the longitudinal direction of the chain, such that adjacent runners engage each other by way of a tongue and fork on either end of each runner, with a tongue of one runner engaging a fork of the adjacent runner.

* * * * *